United States Patent
King

(10) Patent No.: US 6,535,548 B1
(45) Date of Patent: Mar. 18, 2003

(54) MOBILE WIRELESS COMMUNICATION DEVICES FOR RECEIVING SPREAD SPECTRUM SIGNALS AND METHODS THEREFOR

(75) Inventor: Thomas M. King, Tempe, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/071,630

(22) Filed: Feb. 7, 2002

Related U.S. Application Data

(60) Provisional application No. 60/287,119, filed on Apr. 26, 2001.

(51) Int. Cl.[7] .......................... H04B 15/00; H04K 1/00; H04L 27/30
(52) U.S. Cl. ........................................ 375/150; 375/343
(58) Field of Search .................. 375/150, 343, 375/147, 149, 152, 140, 141, 142, 143, 145, 367; 370/515, 342, 335, 320, 350

(56) References Cited

U.S. PATENT DOCUMENTS

| | | | | |
|---|---|---|---|---|
| 5,495,509 A | * | 2/1996 | Lundquist et al. | 375/367 |
| 5,910,948 A | * | 6/1999 | Shou et al. | 370/335 |
| 5,914,943 A | * | 6/1999 | Higuchi et al. | 370/320 |
| 6,044,074 A | * | 3/2000 | Zehavi et al. | 370/350 |
| 6,128,332 A | * | 10/2000 | Fukawa et al. | 375/146 |
| 6,205,168 B1 | * | 3/2001 | Somayazulu | 375/149 |
| 6,370,134 B1 | * | 4/2002 | Aramaki | 370/342 |
| 6,385,232 B1 | * | 5/2002 | Terashima | 375/149 |

* cited by examiner

Primary Examiner—Phuong Phu
(74) Attorney, Agent, or Firm—Roland K. Bowler, II

(57) ABSTRACT

A mobile wireless communication device for extracting time from a spread spectrum signal including a repeating short chip code and a repeating long chip code, a ratio of the long and short chip is a non-integer having a remainder bit that accumulates over successive intervals of the chip codes. The device includes a receiver for receiving (710) the spread spectrum signal, means for determining corresponding bit numbers (720) of the long and short chip codes at a particular time, means for determining a number of accumulated remainder bits (730) as a function of the bit numbers of the long and short chip codes, and means for determining time (740) as a function of the number of accumulated remainder bits.

19 Claims, 7 Drawing Sheets

— PRIOR ART —

| TIME EPOCH | PRIOR ART | (FIG.2) | INVENTION | (FIG.4) |
|---|---|---|---|---|
| (SECONDS) | X | Y | X | Y |
| 0.0 | 0 | 0 | 0 | 0 |
| 1.5 | 0 | 0 | 0 | 1 |
| 3.0 | 0 | 0 | 0 | 2 |
| 4.5 | 0 | 0 | 0 | 3 |
| 6.0 | 0 | 0 | 0 | 4 |
| 7.5 | 0 | 0 | 0 | 5 |
| ... | ... | ... | ... | ... |
| 58.5 | 0 | 0 | 0 | 39 |
| 60.0 | 0 | 0 | 0 | 0 |
| 61.5 | 0 | 0 | 0 | 0 |
| ... | ... | ... | ... | ... |

MOBILE WIRELESS COMMUNICATION DEVICES FOR RECEIVING SPREAD SPECTRUM SIGNALS AND METHODS THEREFOR

REFERENCE TO RELATED PATENT APPLICATIONS

The present application claims the benefits under 35 U.S.C. 119(c) from co-pending provisional U.S. application Ser. No. 60/287,119 filed on Apr. 26, 2001, entitled "Mobile Wireless Communication Devices For Receiving Spread Spectrum Signals And Methods Therefor".

FIELD OF THE INVENTIONS

The present inventions relate generally to spread spectrum communications, and more particularly to extracting time from spread spectrum signals, for example from Global Positioning System (GPS) signals, with mobile wireless communication devices, and methods therefor.

BACKGROUND OF THE INVENTIONS

GPS enabled cellular handsets will likely provide near term solutions for complying with the E-911 location determination mandate of the Federal Communications Commission.

The existing GPS satellites transmit a C/A code (having a length of 1023 bits) and a 50 bit per second (BPS) navigation data message from which time can be determined on an L1 channel signal at 1575.42 MHz. The L1 channel also includes a P/Y military signal. The existing GPS satellites also transmit the P/Y military signal on an L2 channel signal at 1227.6 MHz.

Military receivers are capable of demodulating the P/Y signal and measuring the delay between the L1 and L2 channel signals, which permits removal of ionospheric delay error, thus providing measurement accuracies under 5 meters. In contrast, measurement accuracies based only on the L1 channel signal are limited to approximately 20–25 meters, due largely to ionospheric delay.

Demodulation of the 50 BPS navigation data message is possible down to a signal detection level of approximately 30 dB-Hz, but this is generally too high for most GPS enabled cellular handsets, which require a lower signal detection level of about 20 dB-Hz or less. In GPS enabled cellular handsets, it is desirable to extract precise time directly from GPS spread spectrum signals without having to demodulate the navigation data message.

In the past, various proposals have been made to modify GPS transmission signals and in particular the L2 channel signal to better accommodate civil/commercial applications when the GPS satellites are upgraded.

A current GPS signal modification proposal described in the recently published "L2 Civil Signal (L2CS) Design Plans", for example, includes a new C/A code on the L2 channel. The generation of the proposed new L2CS signal is based on a bit-by-bit multiplexing of long and short chip codes, one of which is an integer multiple of the other. The long and short chip codes of the L2CS proposal are both longer than the existing 1023 bit C/A Code and provide up to 45 dB of cross correlation protection, the dynamic range within which most cellular communication devices operate.

The proposed new L2CS signals also extend the time ambiguity, or window of certainty, to 1.5 seconds. The extended time ambiguity is a substantial improvement over that of the existing GPS C/A code, which has a time ambiguity of 1 millisecond, or 20 milliseconds if one considers the edges of the 50 BPS navigation data message.

Prior Art FIG. 1 illustrates a schematic circuit block diagram for implementing the new L2CS GPS signal. The circuit includes a 767,250 Chip Code Generator for generating a 767,250 long chip code and a 10,230 Chip Code Generator for generating a 10,230 short chip code. Prior art FIG. 2 illustrates the long chip code as an integer multiple of the short chip code, which repeats exactly 75 times for each 767,250 long chip code. Although time may be known precisely during any interval T, corresponding to the 1.5 second period of the long chip code, there is no way to determine readily in which repeating interval of the long chip code time has been measured, i.e., at interval 1, 2, 3 . . . ?

The bit-by-bit multiplexing operation of the proposed L2 Civil Signal allows rapid handover from the 10,230 chip short code to the 767,250 chip long code by one of two alternative methods. In one handover scheme, in Prior Art FIG. 1, the 10,230 chip short code is mixed with an L-5 like data message including precise time, similar to the L1 channel GPS signal. Cellular handsets, however, may be unable to demodulate this signal. Also, the navigation data message with precise "Time of Week" bits and other information, including for example, satellite orbit ephemeris, is transmitted only every 6 seconds, which extends the time and battery power required by cellular handsets to obtain time.

In another handover scheme, the receiver directly acquires the 10,230 short chip code and then acquires the 767,250 long chip code by trial and error correlation, in which all 75 possible alignments of the long chip code relative to the short chip code are tried. In this latter scheme, when the receiver locks onto the 767,250 long chip code, time is known precisely to a resolution of 1 short or long code chip time (about 1 microsecond), but absolute time remains unknown.

In some applications, including cellular handsets where it is desired to obtain time without having to demodulate a periodically transmitted navigation data message, 1.5 seconds may be insufficient to extract time from the GPS signals. What is desired in these and other applications is a method of extracting precise time directly from spread spectrum signals without having to demodulate the navigation data message.

The various aspects, features and advantages of the present invention will become more fully apparent to those having ordinary skill in the art upon careful consideration of the following Detailed Description of the Invention with the accompanying drawings described below.

BRIEF DESCRIPTION OF THE DRAWINGS

FIG. 6 is a comparison of the relationship between bit numbers for long and short chip codes of FIG. 2 and the exemplary embodiment of the invention illustrated in FIG. 4.

DETAILED DESCRIPTION OF THE INVENTIONS

In the present invention, a spectrum signal includes a repeating short chip code and a repeating long chip code, wherein the long chip code is a non-integral multiple of the short chip code. A ratio of long chip code length and short chip code lengths thus includes a positive or negative remainder, which accumulates as the chip codes repeat.

Figure 3:
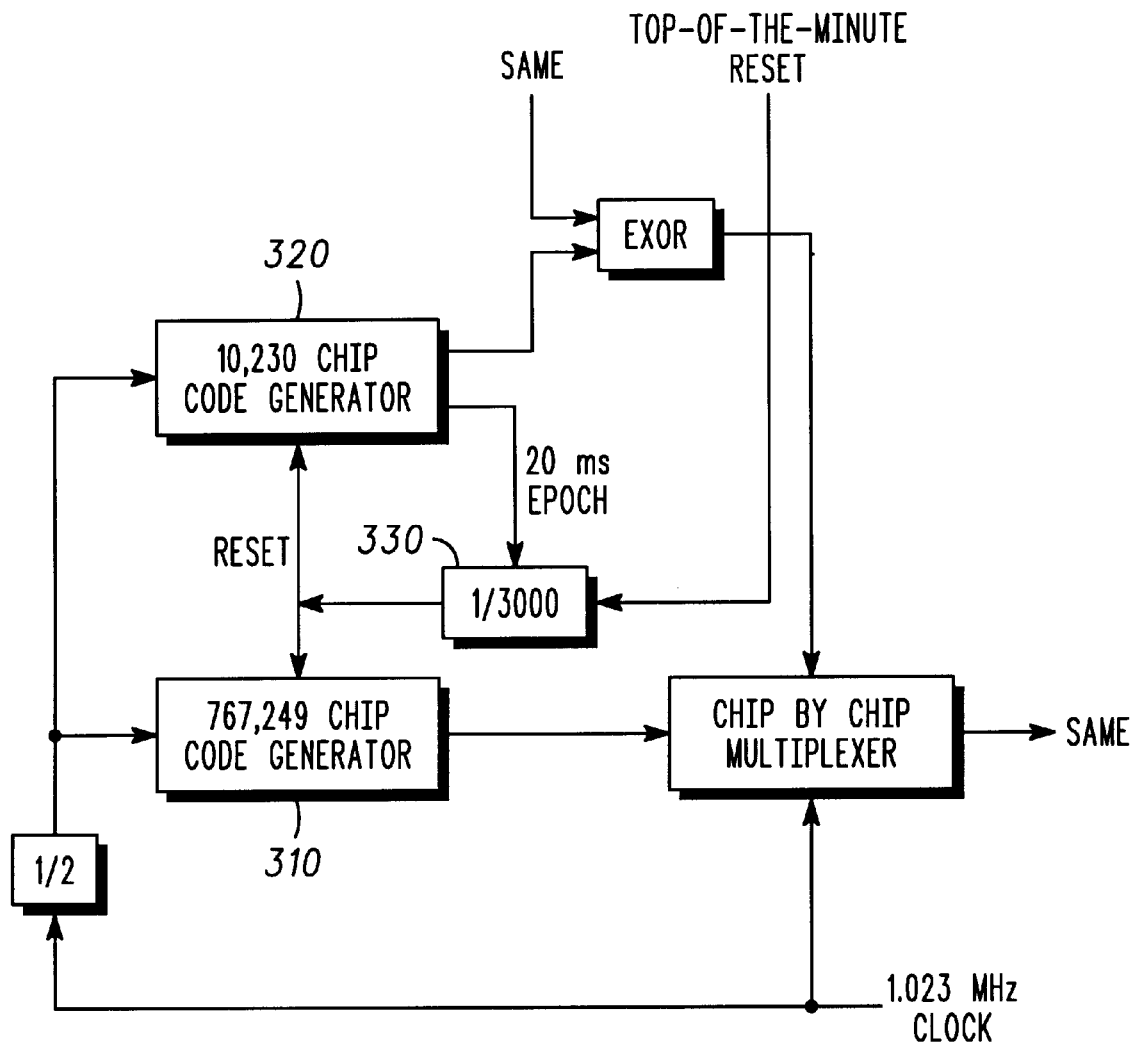
FIG. 3 is a schematic diagram of a modified portion of the circuit in FIG. 1 for generating spread spectrum signals according to an exemplary embodiment of the present invention.

In exemplary circuit schematic of FIG. 3, the exemplary long chip code is a 767,749 chip code generated by a 767,249 Chip Code Generator 310, and the exemplary short chip code is a 10,230 chip code generated by a 10,230 Chip Code Generator 320. The clock rate (or chip rate) of each code is 1.023 MHz, and since the chips of the short code and long code are multiplexed when transmitted, the effective time of each chip is 2/1,023,000 seconds. The short chip code repeats every 20 milliseconds, while the long chip code repeats every 1.5 seconds minus the time of one chip, or 1.499990225 seconds. The ratio of the long chip code length to short chip code length is 74.99990225, or 75 remainder 10,229. The 10,229 remainder can be described as a −1 bit remainder.

Figure 4:
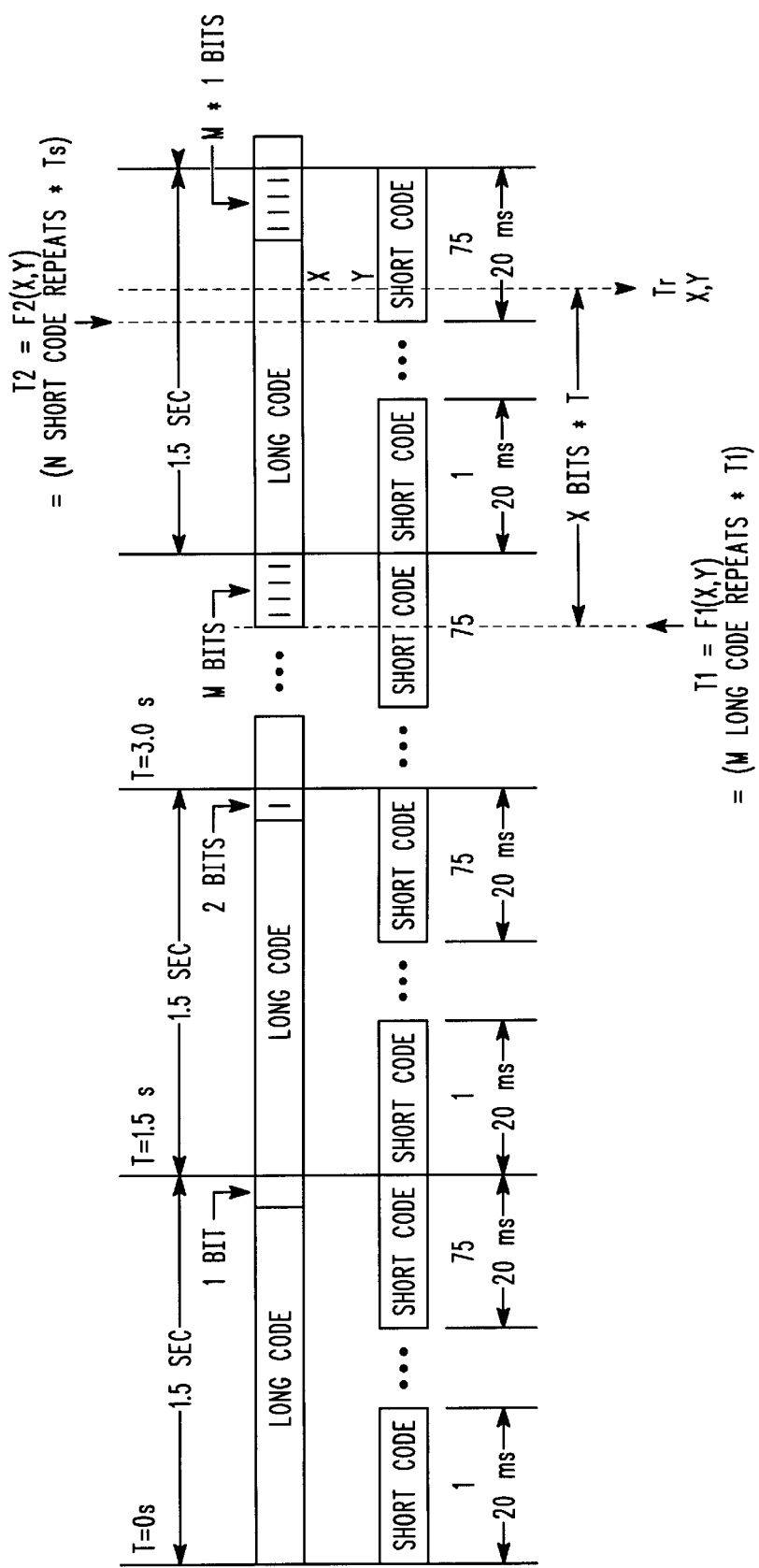
FIG. 4 is an illustration of the relationship between long and short chip codes wherein the ratio therebetween is such that a chip is effectively removed from the long chip code over each successive interval thereof.

In FIG. 3, the ratio of the long to short chip codes is such that the long chip code is effectively short-cycled one chip, or bit, every 1.5 seconds for a period of 1 minute. FIG. 4 illustrates the long chip code effectively short-cycled 1 bit during each period thereof, which result from the non-integer relationship between the long and short chip codes. In the exemplary embodiment, in the first period or interval the long chip code is short-cycled 1 bit, in the second interval it is short-cycled two bits, etc.

Figure 5:
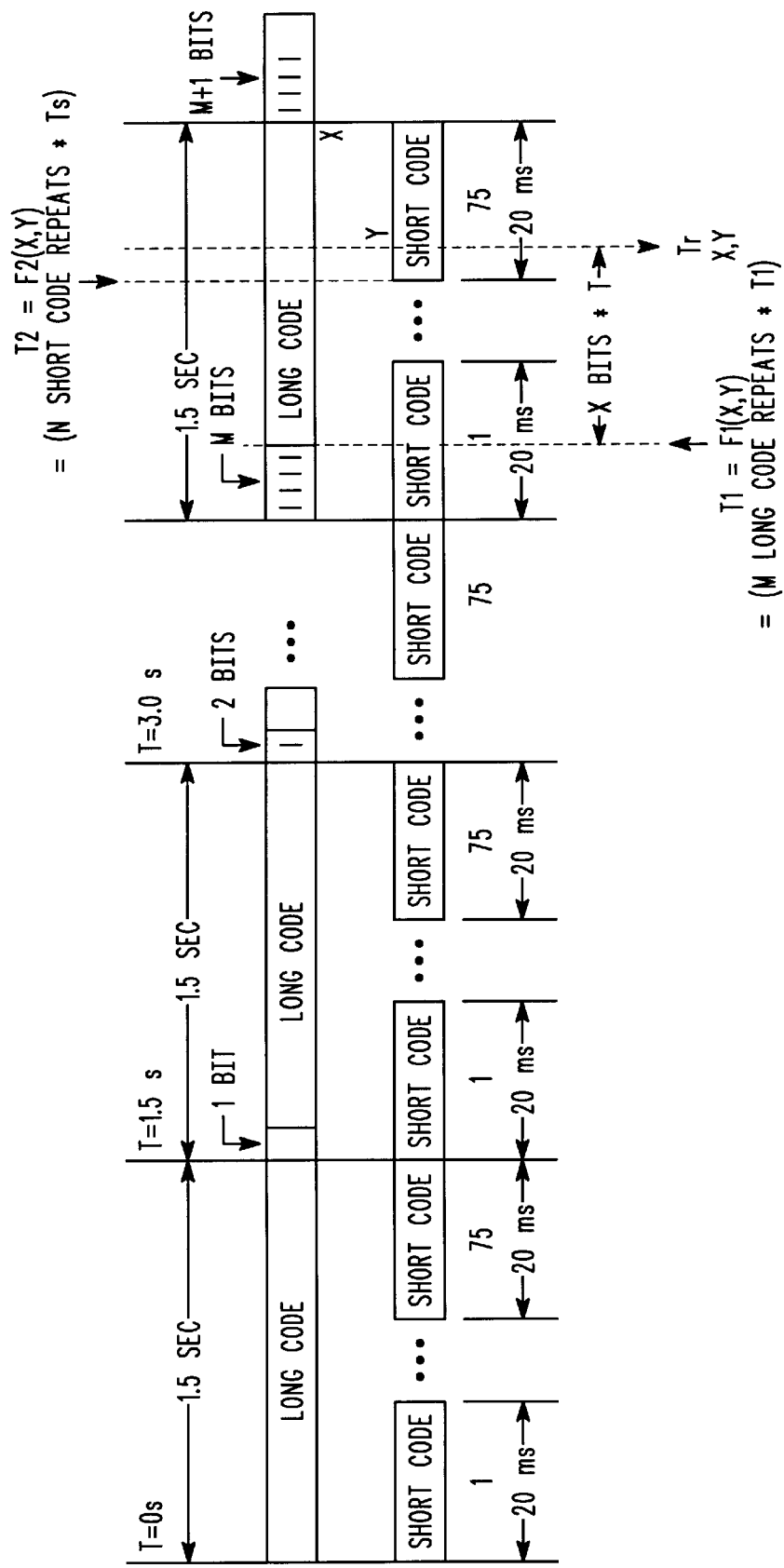
FIG. 5 is an illustration of the relationship between long and short chip codes wherein the ratio therebetween is such that a chip is effectively added to the long chip code over each successive interval thereof.

In an alternative embodiment, the relationship between the long and short chips codes is such that one or more bits are effectively added to the long chip code during each time interval for example, by generating a 767,751 chip code with a 767,751 chip code generator instead of the 767,749 chip code generator of FIG. 3. The 767,751 long chip code has a period or duration of 1.5 seconds plus the time of one chip, or 1.500001955 seconds. The ratio of the long chip code to the short chip code is 75.00009775, or 75 remainder 1. FIG. 5 illustrates the long chip code effectively long-cycled 1 bit during each period thereof. In the first period or interval the long chip code is long-cycled 1 bit, in the second interval it is long-cycled two bits, etc.

In FIG. 3, the remainder of the ratio of the long chip code to the short chip code is accumulated for a period of one minute, which 1 minute period is controlled by the 1/3000 divide ratio block 230. More particularly, the exemplary divide ratio block counts 20 millisecond code generator epochs (3000 counts represents 1 minute), and then resets the 767,249 Chip Code Generator to its initial state, whereupon the remainder accumulation process repeats again for the next minute.

Figure 1:
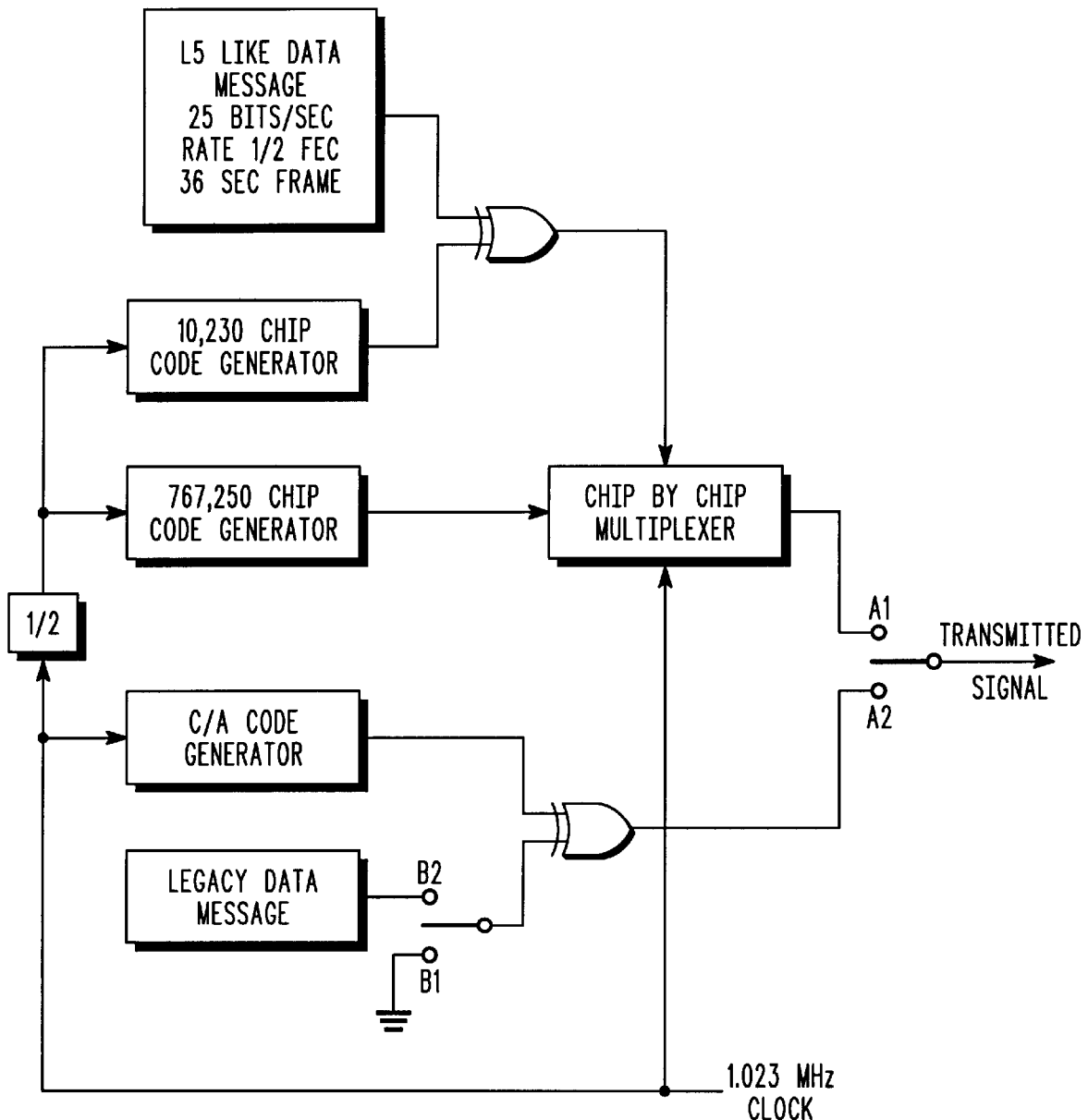
FIG. 1 is a Prior Art circuit for generating the proposed L2CS spread spectrum GPS signals.
Figure 2:
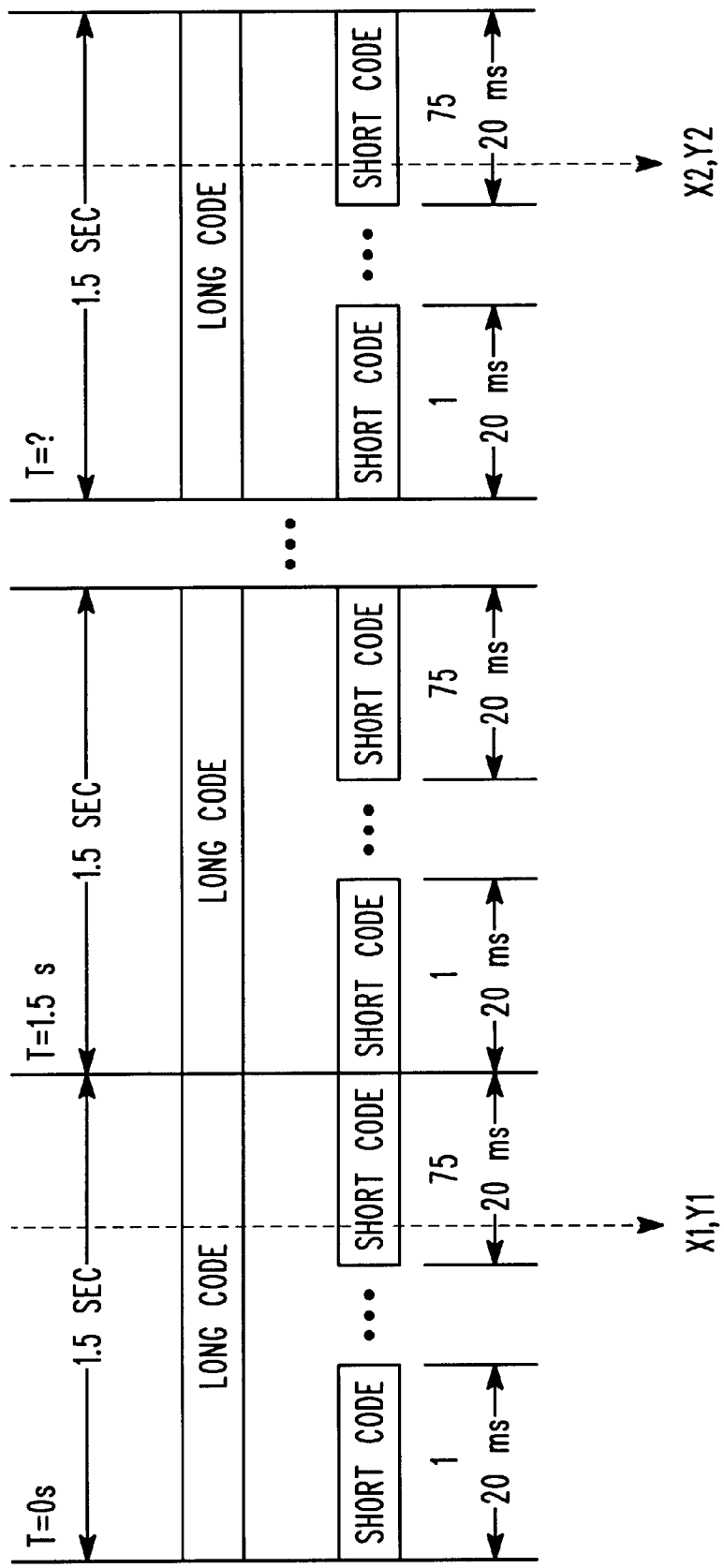
FIG. 2 is a Prior Art illustration of the relationship between long and short chip codes of the proposed prior art L2CS signal format.

FIG. 6 is a tabular comparison of the relationship between bit numbers for long and short chip codes of the prior art diagram of FIG. 2 and the short-cycling scheme of FIG. 4. In the prior art, the long chip code is an integer multiple, 75, of the short chip code. Thus, in FIG. 6, there is no accumulation of bits in the long chip code bit column Y. In the exemplary embodiments of the present invention, remainder bits are accumulated during each period of the long chip code. The Y column of the table indicates the accumulating number of remainder bits of the long chip code over successive repeats of the long chip code for a period of 1 minute. The number of remainder bits accumulated is indicative of the number of repeats of the long chip code, which provides a basis for extracting absolute time from the spread spectrum signal without demodulating the navigation data message.

In FIG. 6, as discussed above, the number of remainder bits is accumulated for a 1 minute time period, as determined by the ratio of the divide circuit in FIG. 3. In another embodiment, the time interval over which the remainder bits are accumulated is one-week, which coincides with the period during which the GPS reference clock is reset. The one week long accumulation interval, or any other desired interval, may be selected by appropriately changing the divide ratio block 230 in FIG. 3.

Figure 7:
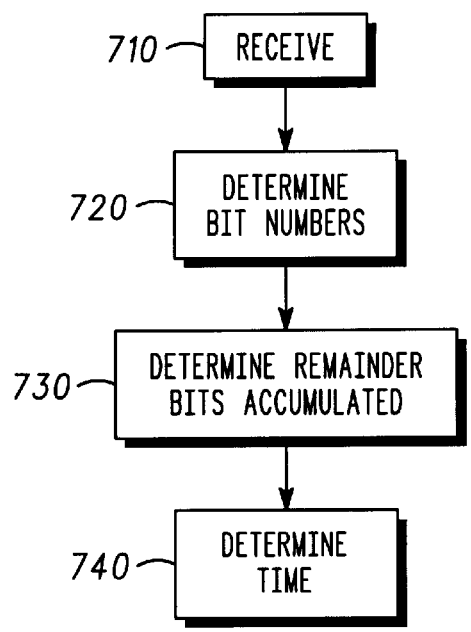
FIG. 7 is a process flow diagram for obtaining time from spread spectrum signals received, for example by a mobile wireless communication device.
Figure 8:
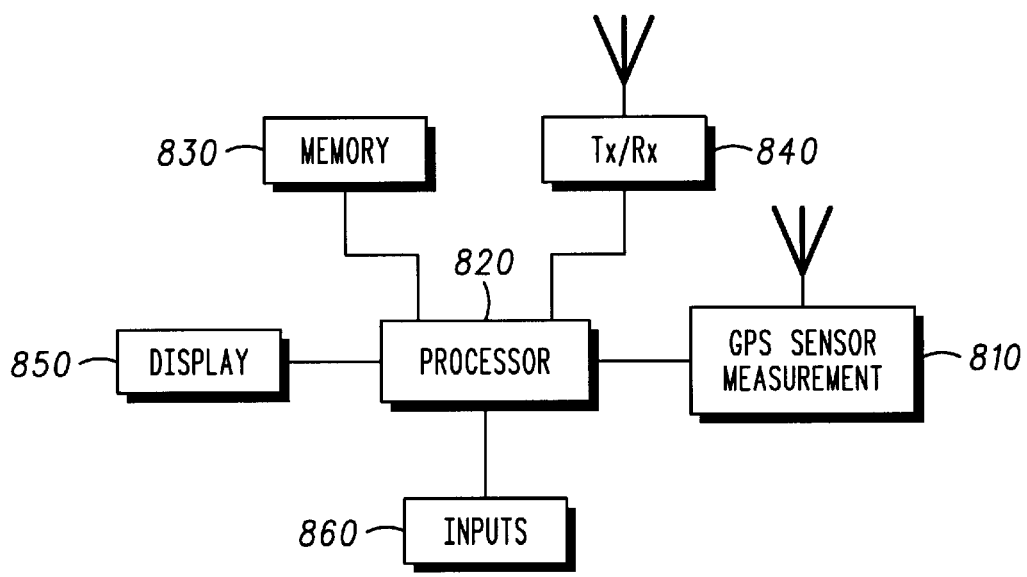
FIG. 8 is an exemplary mobile wireless communication device for receiving spread spectrum signals having repeating long and short chip codes, wherein a ratio thereof is a non-integer number with a remainder bit.

In FIG. 7, at block 710, spread spectrum signals are received in a mobile wireless communication device or some other receiver. FIG. 8 illustrates a GPS enabled mobile wireless communication device or some other device having a GPS receiver, or more generally a spread spectrum signal receiver, 810 for receiving signals from GPS satellites.

The exemplary mobile wireless communication device of FIG. 8 also includes memory 830, a radio receiver/transmitter 840, and may include a display 850 and inputs 860, coupled to the processor, as is known generally.

In FIG. 7, at block 720, corresponding bit numbers of the long and short chip codes received by the receiver are determined at some particular time by correlating the received long and short chip codes with corresponding long and short chip codes generated at the mobile wireless communication device. In FIG. 8, these operations may be performed for example by the GPS sensor and measurement device 810 or by some other signal correlation or processing device, for example, serial or parallel correlators, coupled to the processor 820. Generally, the bit numbers of the long and short chip codes may be determined by the correlation operation.

Generally, the number of accumulated remainder bits is a function of the bit numbers of the long and short chip codes. In FIG. 7, the number of accumulated remainder bits is determined at block 730 as a function of the bit numbers of the long and short chip codes determined at block 720.

In the exemplary embodiment where ratio of the long and short chip codes is such that the long chip code is effectively short-cycled 1 bit during each period of the long chip code, the number of accumulated remainder bits is proportional to a difference between first and second ratios. The first ratio is a fractional part of the long chip code bit number Y divided by the short chip code length, the second ratio is the short chip code bit number X divided by the short chip code length. The number of accumulated remainder bits, M, may be expressed quantitatively as follows:

$$M = [\text{Short Code Length}] * [(\text{Fract\_Part of } (Y/\text{Short Code Length})) - (X/\text{Short Code Length})], \quad \text{Eq (1)}$$

wherein X and Y are the short and long chip code bit numbers determined by correlation at block 720, and the "short chip code length" is the equality factor.

In the alternative embodiment where the ratio of the long and short chip codes is such that a bit is effectively added to the long chip code during each successive period thereof, the number of accumulated remainder bits, M, may be expressed quantitatively as $$M=(-)[\text{Short Code Length}]*[(\text{Fract\_Part }(Y/\text{Short Code Length}))-(X/\text{Short Code Length})], \quad \text{Eq. (2)}$$

wherein X and Y are the short and long chip code bit numbers determined by correlation at block 720, and the negative of the "short chip code length" is the equality factor.

Generally, time is a function of the number of remainder bits accumulated. Alternatively, time may be determined as a function of the number of accumulated remainder bits and the bit numbers of both the long and short chip codes, as discussed further below.

In embodiments where the ratio of the long and short chip codes is such that a single bit is effectively added to or removed from the long chip code during each period thereof, the time Tr is determined by $$Tr=[M*(\text{Long Code Repeat Time})+(Y*T)], \quad \text{Eq. (3)}$$

where M is the number of accumulated remainder bits, Y is the bit number of the long chip code, and T is the bit time of the long chip code.

In embodiments where the ratio of long and short chip codes is such that a single bit is effectively added to or removed from the long chip code during each period thereof, time may be expressed alternatively in terms of the bit number of the short chip code by first determining the number of repeats of the short bit code, N, as follows:

$$N=[(M*\text{long chip code length}-M)/(\text{short ship code length})]+\text{Integer\_Part }[(Y+M)/(\text{short chip code length})] \quad \text{Eq. (4)}$$

Time, Tr, is then determined in terms of N and the short chip code bit number by:

$$Tr=N*(\text{short code repeat time})+(X*T), \quad \text{Eq. (5)}$$

where N is the number of repeats of the short bit code, X is the bit number of the short chip code, and T is the bit time of the short chip code. The determination of the bit number X and Y, the number of accumulated remainder bits, and number of repeats of the short chip code are performed by a processor, for example the processor 820 of the mobile wireless communication device.

The transmitters, for example the GPS satellites, transmitting the short and long chip code sequences are synchronized at an agreed-to point in time, such as the GPS time-of-week reset time of Saturday Midnight GMT. Particularly, the short and long chip codes are set to the first bit of the short chip code and the first bit of the long chip code at the agreed-to point in time. Thus, when the receiver uses the method described above in order to determine the unambiguous time, the receiver has absolute time available.

The propagation time of the signal from the satellite to the ground-based receiver, e.g., the mobile wireless communication device, must be accounted for generally and included in any absolute measurement of time in the receiver, as is well known by those having ordinary skill in the art. The propagation time is determined by computing the range between a precise position of the satellite in the sky and an estimated position of the receiver on the ground, and then by dividing the computed range by the speed of light. The satellite position coordinates are obtained from satellite ephemeris data, obtained directly from the satellite or from a ground-based GPS receiver, which transmits the data to the receiver, for example via a cellular telephone data message.

In addition to the propagation time, satellite clock error must also be included in the accumulation of absolute receiver time. The satellite clock correction parameters are also obtained by the mobile wireless communication device via one of the two data paths discussed above, i.e., directly form the satellites or from a ground-based receiver.

By measuring the time parameter Tr using the procedures described above, and by summing in the propagation time from the signal and the satellite clock correction parameters, the receiver can compute the precise time of any measurement epoch in the mobile wireless communication device without having to demodulate the satellite transmitted data message.

While the present inventions and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A method for obtaining time from a spread spectrum signal in a mobile wireless communication device, comprising:

receiving a spread spectrum signal at the mobile wireless communication device, the spread spectrum signal including a repeating short chip code and a repeating long chip code, a ratio of the long and short chip codes is a non-integer number having a remainder bit that accumulates over successive periods of the long chip code;

determining corresponding bit numbers of the long and short chip codes at a particular time by correlating the received long and short chip codes with corresponding long and short chip codes generated at the mobile wireless communication device;

determining a number of accumulated remainder bits as a function of the bit numbers of the long and short chip codes;

determining time as a function of the number of accumulated remainder bits.

2. The method of claim 1, determining time proportional to a summation of the number of accumulated remainder bits and the bit number of the long chip code.

3. The method of claim 2, determining the number of accumulated remainder bits proportional to a difference between first and second ratios, the first ratio is a fractional part of the long chip code bit number divided by the short chip code length, the second ratio is the short chip code bit number divided by the short chip code length.

4. The method of claim 3, determining the number of accumulated remainder bits proportional to a product of the difference and the short chip code length.

5. The method of claim 4, the spread spectrum signal is a Global Positioning System (GPS) signal, accumulating remainder bits over a period coinciding with a period during which a GPS reference clock is reset.

6. The method of claim 1, determining a number of repeats of the short chip code as a function of the number of accumulated remainder bits and the bit number of the long chip code, determining time as a function of the number of repeats of the short chip code and the bit number of the short chip code.

7. The method of claim 1, determining time as a function of the number of accumulated remainder bits and the bit numbers of the long and short chip codes.

8. A method for obtaining GPS time from a spread spectrum signal in a GPS enabled mobile wireless communication device, comprising:

receiving a spread spectrum signal at the mobile wireless communication device, the spread spectrum signal including a repeating short chip code and a repeating long chip code, a ratio of the long chip code to the short chip code is a non-integer number having a remainder bit that accumulates over successive periods of the long chip code;

determining corresponding bit numbers of the long and short chip codes at a particular time by correlating the received long and short chip codes with corresponding long and short chip codes generated at the mobile wireless communication device;

determining a number of accumulated remainder bits as a function of the bit numbers of the long and short chip codes;

determining time as a function of the number of accumulated remainder bits.

9. The method of claim 8, determining time proportional to a summation of the number of accumulated remainder bits and the bit number of the long chip code.

10. The method of claim 9, determining the number of accumulated remainder bits proportional to a difference between first and second ratios, the first ratio is a fractional part of the long chip code bit number divided by the short chip code length, the second ratio is the short chip code bit number divided by the short chip code length.

11. The method of claim 10, determining the number of accumulated remainder bits proportional to a product of the difference and the short chip code length.

12. The method of claim 8, accumulating remainder bits over a week long period coinciding with a period during which a GPS reference clock is reset.

13. The method of claim 8, determining a number of repeats of the short chip code as a function of the number of accumulated remainder bits and the bit number of the long chip code, determining time as a function of the number of repeats of the short chip code and the bit number of the short chip code.

14. The method of claim 8, determining time as a function of the number of accumulated remainder bits and the bit numbers of the long and short chip codes.

15. A mobile wireless communication device comprising:

a spread spectrum signal receiver for receiving a spread spectrum signal having a repeating short chip code and a repeating long chip code, a ratio of the long chip code to the short chip code is a non-integer with a remainder bit that accumulates over successive periods of the long chip code spread spectrum signal correlation means for determining corresponding bit numbers of the long and short chip codes of the spread spectrum signal at a particular time;

means for determining a number of accumulated remainder bits as a function of the bit numbers of the long and short chip codes, means for determining time as a function of the number of accumulated remainder bits.

16. The device of claim 15, means for determining the number of accumulated remainder bits M proportional to $$[\text{Fractional\_Part}(Y/\text{short chip code length})] - [X/\text{short chip code length}],$$

where Y is the bit number of the long chip code and X is the bit number of the short chip code.

17. The device of claim 16, means for determining the time proportional to M+Y.

18. The device of claim 15, the spread spectrum signal is a Global Positioning System (GPS) signal, means for determining the number of accumulated remainder bits over a period coinciding with a period during which a GPS reference clock is reset, the receiver is a GPS receiver.

19. The device of claim 15, means for determining time as a function of the number of accumulated remainder bits and the bit numbers of the long and short chip codes.

* * * * *